US012664265B2

(12) United States Patent
Seaborn et al.

(10) Patent No.: US 12,664,265 B2
(45) Date of Patent: Jun. 23, 2026

(54) RANSOMWARE MITIGATION USING VERSIONING AND ENTROPY DELTA-BASED RECOVERY

(71) Applicant: International Business Machines Corporation, Armonk, NY (US)

(72) Inventors: Mark Duane Seaborn, Algonquin, IL (US); Jacqueline Hegedus Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 18/216,578

(22) Filed: Jun. 29, 2023

(65) Prior Publication Data

US 2025/0005146 A1    Jan. 2, 2025

(51) Int. Cl.
*G06F 21/55* (2013.01)
*G06F 21/56* (2013.01)
*G06F 21/60* (2013.01)

(52) U.S. Cl.
CPC .......... *G06F 21/554* (2013.01); *G06F 21/566* (2013.01); *G06F 21/602* (2013.01); *G06F 2221/034* (2013.01)

(58) Field of Classification Search
CPC .... G06F 21/554; G06F 21/566; G06F 21/602; G06F 2221/034
See application file for complete search history.

(56) References Cited

U.S. PATENT DOCUMENTS

| | | | |
|---|---|---|---|
| 10,121,003 B1 * | 11/2018 | Adams .................. | G06F 21/565 |
| 10,423,782 B2 | 9/2019 | Muttik et al. | |
| 10,963,564 B2 | 3/2021 | Chelarescu et al. | |
| 11,232,206 B2 | 1/2022 | Chelarescu et al. | |
| 12,182,113 B1 * | 12/2024 | Orson ............... | G06F 16/24537 |
| 2015/0271206 A1 * | 9/2015 | Schultz .................. | H04L 63/20 |
| | | | 726/3 |
| 2018/0173874 A1 | 6/2018 | Muttig et al. | |

(Continued)

FOREIGN PATENT DOCUMENTS

| | | |
|---|---|---|
| WO | 2021/061206 A1 | 4/2021 |

OTHER PUBLICATIONS

International Searching Authority, "Notification of Transmittal of the International Search Report and the Written Opinion of the International Searching Authority, or Declaration," Patent Cooperation Treaty, Sep. 6, 2024, 14 pages, International Application No. PCT/EP2024/066333.

*Primary Examiner* — Linglan Edwards
*Assistant Examiner* — Jacob Benedict Knackstedt
(74) *Attorney, Agent, or Firm* — Anthony M. Pallone

(57) ABSTRACT

A mitigation system protects data in a data store that is not yet encrypted by a successful ransomware attack against encryption. Data is stored in the data store as a set of versions identified in a data tree, and a version can only be updated by writing a new version to the tree. Access controls to prevent modification of the tree are also in place. Following an attack, a restore function is executed to attempt recovery. This function computes an entropy delta that compares an entropy of an encrypted version, with an entropy of versions of the data not yet encrypted. Based on the computed entropy deltas, the restore function identifies a latest clear version of the data, and a restore operation is then is initiated with respect to this version.

24 Claims, 5 Drawing Sheets

500 — VERSIONING FUNCTION AND ACCESS CONTROLS IN PLACE

502 — RANSOMWARE ATTACK

504 — RESTORE FUNCTION COMPUTES ENTROPY DELTAS

506 — IDENTIFY LATEST CLEAR VERSION OF THE DATA

508 — INITIATE DATA RECOVERY FROM THE LATEST CLEAR VERSION

(56) References Cited

U.S. PATENT DOCUMENTS

| 2018/0189488 | A1  | 7/2018  | Arora et al. |   |
|---|---|---|---|---|
| 2019/0042369 | A1* | 2/2019  | Deutsch | G06F 3/0673 |
| 2019/0303572 | A1  | 10/2019 | Chelarescu et al. |   |
| 2020/0226256 | A1* | 7/2020  | Gaurav | G06F 21/565 |
| 2020/0342106 | A1  | 10/2020 | Chelarescu et al. |   |
| 2024/0266004 | A1* | 8/2024  | Van Den Berg | G06N 3/045 |
| 2024/0419816 | A1* | 12/2024 | Karr | G06F 21/78 |
| 2024/0427516 | A1* | 12/2024 | Miller | G06F 3/0673 |

* cited by examiner

100

500 — VERSIONING FUNCTION AND ACCESS CONTROLS IN PLACE

502 — RANSOMWARE ATTACK

504 — RESTORE FUNCTION COMPUTES ENTROPY DELTAS

506 — IDENTIFY LATEST CLEAR VERSION OF THE DATA

508 — INITIATE DATA RECOVERY FROM THE LATEST CLEAR VERSION

RANSOMWARE MITIGATION USING VERSIONING AND ENTROPY DELTA-BASED RECOVERY

BACKGROUND OF THE INVENTION

Technical Field

This disclosure relates generally to protecting data and, in particular, to a system of protection and recovery from ransomware that can mitigate a ransomware attack that was successful in encrypting data critical to a business's operation.

Background of the Related Art

In today's e-commerce ecosystem, cyber threats create real risks and sometimes introduce situations where a business is unable to recover from the attack. A rising concern for both large and small businesses is the risk ransomware introduces to the continuity of business. Ransomware is a type of malware (malicious software) that uses encryption to prevent a victim from reading their own data. Typically, this attack is executed on the victim's premises and affects local data, e.g., in a data center. Once encrypted, the adversary demands a ransom for instructions and keys to decrypt the data.

Although there has been progress made in the ability to recognize and perhaps stop ransomware attacks, there still exists a real threat that ransomware can manage to encrypt some of the target data. Thus, there remains a need to provide techniques that enable a target of a ransomware attack that was successful in encrypting an organization's data to recover from that attack.

BRIEF SUMMARY

This disclosure provides for a technique to mitigate a ransomware attack that has already succeeded in encrypting some portion of a target entity's data. In a system that implements this approach, the entity's data is already stored as a set of versions in a data store, with the versions identified in a data tree. The versioning function also enforces one or more access controls at defined points in the data tree to ensure that the tree cannot be manipulated. According to a first aspect of this disclosure, and after a ransomware attack has occurred, an entropy-based restore function is executed to attempt recovery from the ransomware attack. To this end, this restore function computes an entropy delta that compares an entropy of a version encrypted by the ransomware, with an entropy of one or more versions of the data that are not yet encrypted. The entropy delta computation in effect takes advantage of the attack, because the entropy of an encrypted version of the data will necessarily be higher than the entropy of a clear version of that data. Based on the computed entropy deltas, the restore function then identifies a latest clear version of the data in the data store, and a restore operation is then initiated with respect to this version.

According to a second aspect of this disclosure, an apparatus comprises a processor, and computer memory. The computer memory holds computer program instructions executed by the processor to mitigate a ransomware attack. The computer program instructions comprise program code configured to perform a set of operations following a ransomware attack that has encrypted one or more versions of the set of versions identified in the data tree, wherein one or more versions of the set remain unencrypted. As described above, the operations compute an entropy delta that compares an entropy of a version encrypted by the ransomware attack to an entropy of the one or more versions that remain unencrypted. Based on the computed entropy deltas, a given version of the set of versions that remains unencrypted is identified, and a restore operation is then initiated with respect to the identified given version.

According to a third aspect of this disclosure, a computer program product in a non-transitory computer readable medium is provided. The computer program product holds computer program instructions executed by a processor in a host processing system configured to mitigate a ransomware attack. The computer program instructions comprise program code configured to perform operations such as the steps described above.

The mitigation approach herein provides a reliable and efficient technique that enables the target entity to recover from any successful attack quickly and with the least amount of disruption to its business. The approach turns the attack against the adversary by using entropy calculations to detect malicious injection of data that is trying to corrupt the state of the system. The entropy delta between data versions enables the system to determine (independent of time) what data has been encrypted by the ransomware so that recovery can proceed efficiently.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
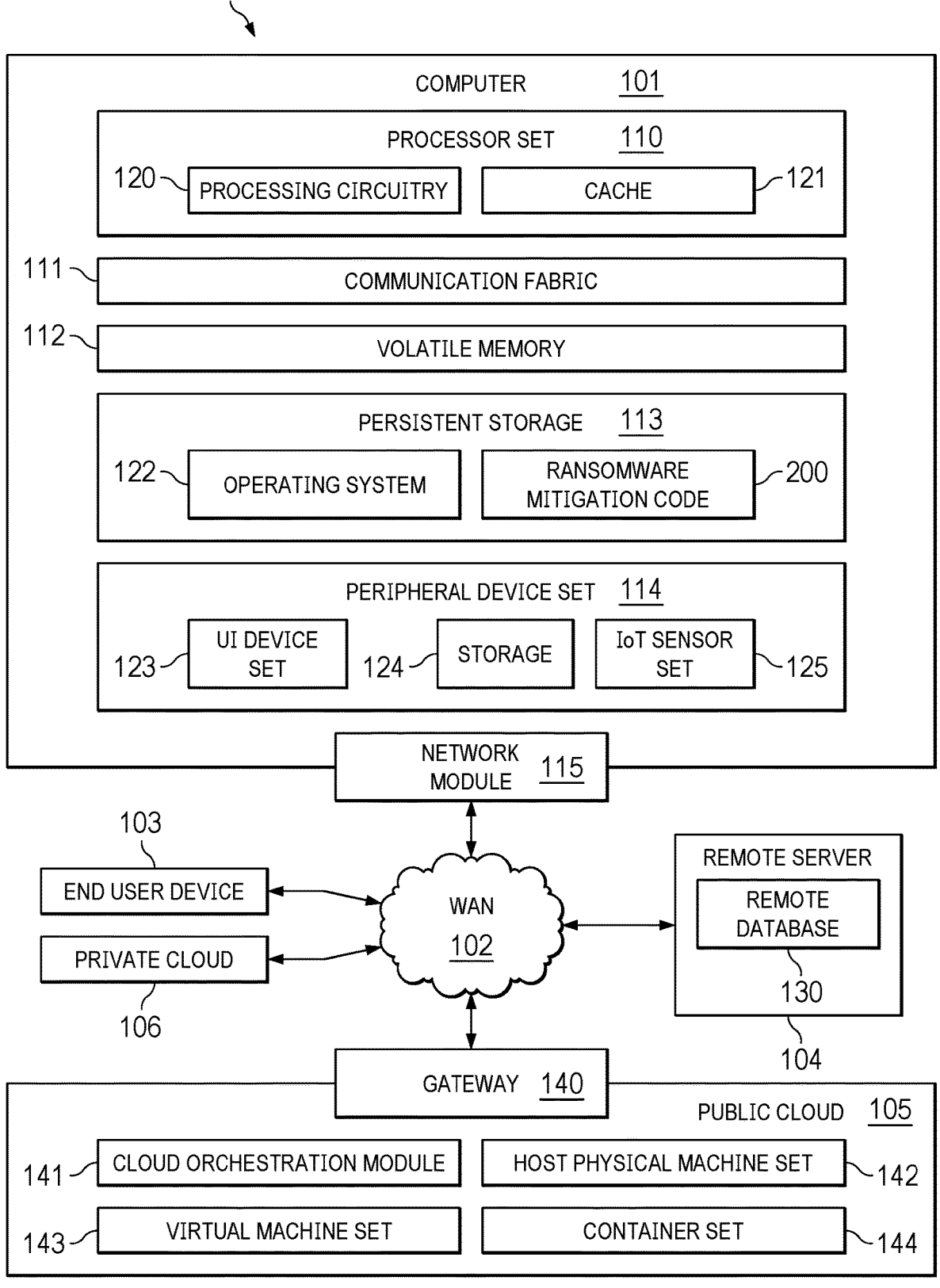
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the ransomware mitigation code 200 of this disclosure. In addition to block 200, computing environment 100 includes, for example, computer 101, wide area network (WAN) 102, end user device (EUD) 103, remote server 102, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 112 (including user interface (UI) device set 123, storage 122, and Internet of Things (IoT) sensor set 125), and network module 115. Remote server 102 includes remote database 130. Public cloud 105 includes gateway 120, cloud orchestration module 121, host physical machine set 122, virtual machine set 123, and container set 122.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 112 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 122 is external storage, such as an external hard drive, or insertable storage, such as an SD card. Storage 122 may be persistent and/or volatile. In some embodiments, storage 122 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 102 is any computer system that serves at least some data and/or functionality to computer 101. Remote server 102 may be controlled and used by the same entity that operates computer 101. Remote server 102 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 102.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 121. The computing resources provided by public cloud 105 are typically implemented by virtual computing environments that run on various computers making up the computers of host physical machine set 122, which is the universe of physical computers in and/or available to public cloud 105. The virtual computing environments (VCEs) typically take the form of virtual machines from virtual machine set 123 and/or containers from container set 122. It is understood that these VCEs may be stored as images and may be transferred among and between the various physical machine hosts, either as images or after instantiation of the VCE. Cloud orchestration module 121 manages the transfer and storage of images, deploys new instantiations of VCEs and manages active instantiations of VCE deployments. Gateway 120 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Ransomware

The most common type of ransomware, called encrypting ransomware or crypto ransomware, holds the victim's data hostage by encrypting it. The attacker then demands a ransom in exchange for providing the encryption key needed to decrypt the data. Crypto ransomware begins identifying and encrypting files. Once files have been encrypted, the ransomware alerts the victim of the infection, often via a .txt file deposited on the computer's desktop or through some other notification. The ransom note contains instructions on how to pay the ransom, usually in cryptocurrency or a similarly untraceable method, in exchange for a decryption key or restoration of standard operations.

Cloud Object Storage and Versioning

There are many different options available for organizations that desire to store their data. Object storage is a primary storage solution that is used in the cloud and on-premises solutions as a central storage platform for unstructured data. Object storage is highly-scalable, easy to manage, and it allows users to balance storage cost, location, and compliance control requirements across data sets and essential applications. Object storage is accessed directly from applications, typically by way of RESTful Application Programming Interface (API). In this approach, an object is stored in a flat namespace with all other objects in the same namespace. An object name is used to write and read objects from object storage, which also typically provides the capability to add custom metadata to application data. A system of this type typically provides a software-defined storage solution that runs on-premises and integrates with data on the edge, in a data center or on a private cloud.

Figure 2:
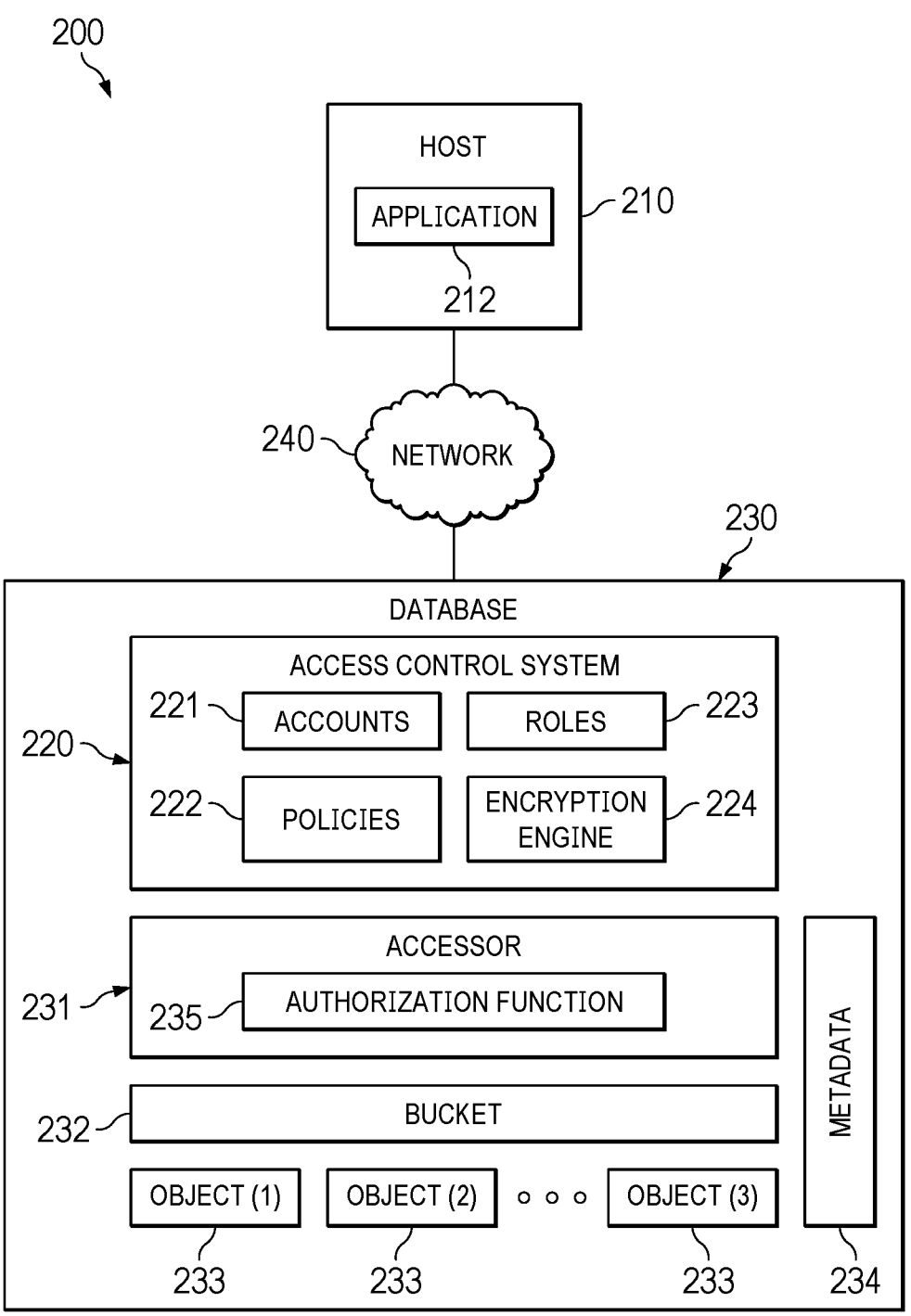
FIG. 2 depicts a representative cloud-based object storage system in which the techniques of this disclosure may be practiced.

FIG. 2 depicts a representation cloud-based object storage system of this type. In this example, the cloud-based object storage system is database 230 that is located in a computing environment 200 that includes host 210 and network 240. Each of the of host 210, and database 230 may include one or more computer systems, such as the data processing system 100 of FIG. 1. Host 210 can be a standalone computing device, a management server, a web server, a mobile computing device, or any other electronic device or computing system capable of receiving, sending, and processing data. In other embodiments, host 210 can represent a server computing system utilizing multiple computers as a server system, such as in a cloud computing environment (e.g., cloud computing environment 105 or 106). In some embodiments, host 210 includes application 212. In some embodiments, host 210 can send a request for cloud services that includes credentials. The credentials can contain/include one or more attributes that define data relating the request. The attributes can be related to an account, a user, an account level, time of the request, location of the request, and the like.

Application 212 can be any combination of hardware and/or software configured to carry out a function on a computing device (e.g., host 210). In some embodiments, application 212 is a web application. In some embodiments, application 212 can be configured to access/process data stored in database 230. Application 212 can be an account-based application. A user or group of users can use one or more accounts to access the data. The access to the processes/data can be based on one or more attributes of each account. In some embodiments, application 212 can be configured to perform one or more functions on a cloud computing network (e.g., the cloud computing environment 105 or 106 shown in FIG. 1). In some embodiments, application 212 can generate the request for cloud services. The request can include credentials consistent with the credentials of host 210. There can also be a credential based on the application.

Database 230 can be any combination of hardware and/or software configured to store data. Database 230 includes Access Control System (ACS) 220, metadata 234, accessor 231, bucket 232, object 233(1), object 233(2), object 233(3), and up to object 233(n), where n can be an integer representing an object. For purposes of the application, object 233(1), object 233(2), and up to object 233(n) can be referred to as object 233 jointly, severally, and/or individually. Thus, and as depicted, database 230 includes object storage or object-based storage architecture (or object store). As described above, object storage is a data storage architecture that manages data as objects. Object storage can allow for large amounts of unstructured data to be stored as a single unit/object.

ACS 220 can be any combination of hardware and/or software configured to control access to an application and/or data. The application can be application 212. The data can be stored in database 230. In some embodiments, ACS 220 can be defined and/or updated by a data owner. The ACS 220 can include rules to direct how data and/or resources can be utilized. In some embodiments, ACS 220 includes accounts 221, policies 222, roles 223, and encryption engine 224. In some embodiments, ACS 220 can be wholly incorporated into database 230 and/or accessor 231. For example, the data owner can access database 230 to update and/or define security policy. This incorporation can provide many of the benefits of the present disclosure. It eliminates the need to access a remote ACS that increases the cost of scaling and can lead to potential bottleneck and other availability and service issues.

Accounts 221 can be a set of credentials that are used to perform a function and/or access data. There can be any number of accounts 221 with ACS 220. New accounts can be created, and/or old accounts can be disabled/deleted. Each account of accounts 221 can be associated with a particular user, a group, an entity (e.g., business), a division, and the like. Accounts 221 can be accessed by properly entering credentials associated with each account. In some embodiments, accounts 221 are associated with one or more attributes. In some embodiments, information relating the account/user can be used as one or more credentials.

Roles 223 can be an attribute of accounts 221. There can be any number of roles within ACS 220. In some embodiments, each role 223 has a defined set of attributes/credentials. The attributes allow access to one or more databases, data types, functions, applications, and the like. In some embodiments, each account 221 can be associated with at least one role 223. Depending on the configuration, an account 221 can have two or more roles or simply a single role associated with the account. In some embodiments, the roles are tiered. Each role 223 can have at least as many permissions/attributes as the lower-tier roles. For example, there can be a basic user, a supervisory user, and an administrator. The administrator can perform all functions and access all data, the supervisory role, a subset of the administrators, and the basic user, a smaller subset of the supervisory role. In some embodiments, the roles 223 can be associated with an action/function. For example, there can be a role for each type of data manipulation and/or application that uses the data. In some embodiments, the roles can be associated with a category of the user of the data. For example, one role can be a data owner and a data user, where the data owner can add and remove data, and the data user can only view the data.

Policies 222 can be rules/definitions to manage the data. Policies 222 can include any number of attributes. The policy 222 can control when and how data is accessed. Attributes can be based on one or more of location, account, user, job title, time of day, date (e.g., weekends, holidays, and workdays can have different attributes), intended use, frequency of access, and the like. In some embodiments, policies 222 can define attributes that must be present in an access request to allow access to the cloud system.

In some embodiments, there is an overlap between the roles 223 and policies 222. In some embodiments, roles 223 and policies 222 can be combined into a single attribute list. The attribute list can include each condition for which accounts/users can have access to the various data. In some embodiments, the attributes can be defined at any level of granularity.

The encryption engine 224 can be any combination of hardware and/or software configured to encrypt and decrypt data. In some embodiments, encryption engine 224 can be located in host 210 and/or database 230 along with ACS 220. In some embodiments, encryption engine 224 can use attribute-based encryption (ABE). ABE is a type of public-key encryption in which the secret key depends upon the attributes of a requestor.

Metadata 234 can be a set of metadata configured to encapsulate access controls to data within database 230. In some embodiments, each level within database 230 can include a unique set of metadata 234. For example, there can be metadata for database 230 as a whole, for bucket 232, and for each of object 233 separately. In some embodiments, metadata 234 can be incorporated into one or more bucket 232, object 233, or any other level/function within database 230. Said differently, each component within database 230 can include a set of metadata 234 specifically configured for the component to which it is attached. The metadata can include attributes of the policy that define how access can be granted to the resource.

Accessor 231 can be any combination of hardware and/or software configured to allow access to data within database 230. In some embodiments, accessor 231 can compare the credentials received with a request for access to the set of attributes for the requested data/function to determine if access is proper. The comparing include/be performed by an authorization function. If the attributes all match the credentials, then access can be granted. In some embodiments, if any of the attributes do not match, then access can be denied. In some embodiments, accessor 231 include authorization function 235. In some embodiments, accessor 231 can, based on a request, identify one or more target resources, and identify the corresponding attributes and/or authorization function.

Authorization function 235 can be any combination of hardware and/or software configured to determine if a request will be allowed or denied. In some embodiments, the authorization function 235. In some embodiments, accessor 231 includes one or more authorization functions 235. There can a unique authorization function for each unique set of attributes that define access any resource in database 230. As such, more than one authorization function can be utilized to gain access for a single object. For example, there can be a unique set of attributes required to access database 230, a second set to access bucket 232, and a third set for object 233. Accessor 231 can compare the credential to the individual authorization functions three times, where each set of attributes corresponds to an individual authorization function. In some embodiments, two or more resources can share the same set of attributes. For example, a first bucket and a second bucket can use the same set of attributes and authorization function. Another example, a bucket and one or more objects in the bucket can share the same the same set of attributes.

Bucket 232 can be a data organizations tool. In some embodiments, database 230 can include one or more buckets 232. In some embodiments, bucket 232 can be a container for storing one or more data objects. Bucket 232 can be defined based on one or more attributes. The attributes can be used to allow/disallow actions to be performed/access to an object within the bucket. This can include permissions to add and/or delete objects from bucket 232. In some embodiments, the attributes are included in the metadata of bucket 232. The metadata can be received from ACS 220. The metadata can be based on one or more of accounts 221, policies 222 and roles 223.

Object 233 can be a collection of data that represent a file. Each object can include a unique identifier, some amount of metadata, and the data that forms the object. The object can be any type of file (e.g., word processing doc, spreadsheet, photo, video, etc.). Each object 233 can include attribute metadata. The attribute metadata can be received from ACS 220. The attribute metadata can define when access is allowed for the data in the object. The metadata can be based on one or more of accounts 221, policies 222 and roles 223.

Figure 3:
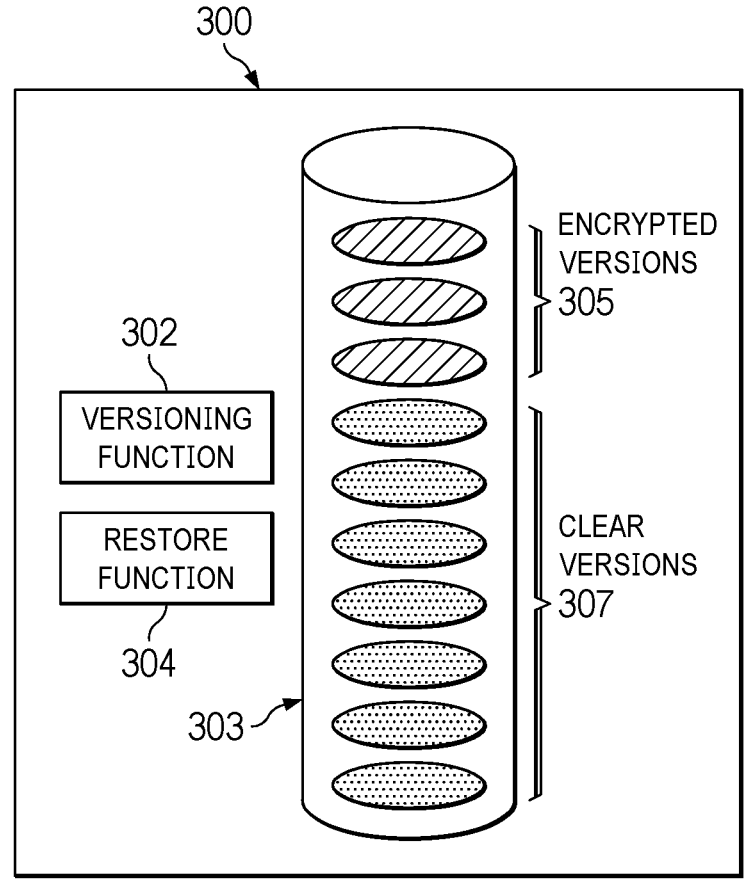
FIG. 3 depicts a high-level block diagram of the ransomware mitigation system of this disclosure.

An object storage system such as described above may provide for versioning. In such a system, versioning allows multiple revisions of a single object to exist in the same bucket. Each version of an object can be queried, read, restored from an archived state, or deleted. Enabling versioning on a bucket can mitigate data loss from user error or inadvertent deletion. Generalizing, and in a data store system that enables versioning (whether an object store or otherwise), versions are identified in a version tree, and an object can only be updated by creating a new version, and wherein an object is not allowed to be deleted from the version tree. Any new writes of data in the system only create one or more new version(s), and those new versions are written to the data store by manipulating the version tree. Ransomware Mitigation System Using Versioning and Entropy Delta-Based Recovery With the above as background, the techniques of this disclosure are now described. In a representative embodiment, and as depicted in FIG. 3, a ransomware mitigation system 300 comprises a set of high-level functions, namely, a versioning mechanism 302, and a restore mechanism 304. Typically, each mechanism is implemented as computer software, namely, a set of computer program code instructions executable by one or more hardware processors. The mechanisms 302 and 304 are depicted as separate from one another, but this is not a requirement, as the functionality described below may be integrated into a single mechanism, or one or both functions may be implemented within or in association with other systems, devices, processes or programs within the computing system in which the techniques herein are practiced. In this representative embodiment, the ransomware mitigation system 300 is associated with a cloud-based object storage solution as was depicted in FIG. 2 and described above. This implementation, however, is not intended to be limiting, as the ransomware mitigation system (or its functionality) may be implemented in any type of data store, whether on-premises, or cloud-based, and with respect to any type of versioning-based storage solution, whether object-based, block-based, or file-based.

The approach herein assumes that a ransomware attack has occurred or is occurring, and that some portion of data to be protected has already been encrypted. As noted above, a goal of the system is to mitigate the attack. The versioning mechanism 302 provides a first line of defense against the ransomware. In particular, and as also previously noted, it is assumed that the data to be protected is stored in a data store using versioning. One type of versioning was described above in connection with the cloud-based object store depicted in FIG. 2, but this type of bucket-based object versioning is merely representative. What constitutes a "version" typically will vary depending on the nature of the data, and the type of data store. In a data store that implements versioning, the data at issue (e.g., an object, a set of objects, a file, a set of files, a data block, a set of data blocks, etc.) is stored as a set of one or more versions, with each version being identified by a version identifier.

The set of one or more versions are identified by a version tree 303. In a cloud-based data store, and as noted above, a version is stored and accessible, typically using a REST-based API. In the case of the object store, each time an object is revised and delivered to the object store, a new version of the object is identified in the version tree 303. Thus, FIG. 3 depicts version tree 303 identifying a plurality of versions of the data. The version tree is sometimes referred to herein more generally as a data tree. Generalizing, and in a system that implements the technique herein, the data store in which data is stored is running versioning, and wherein the way to update an object identified in the tree is to create a new version thereof (and preferably wherein deletion of an object from the tree is not allowed). Any new writes of data in the system only create one or more new version(s), and those new versions must be written to the data store by manipulating the version tree. Versioning ensures that adversaries cannot simply replace a data version identified in the tree.

Thus, before the ransomware attack occurs, versioning is running in the data store. After the ransomware attack has occurred, versioning protects good data (i.e., the data that not been encrypted), from being overwritten. In particular, with versioning running, new writes only create new versions, thereby ensuring that the unaffected data remains free of the attack.

In particular, the data tree in FIG. 3 depicts a set of versions of the data. Here, a ransomware attack has already occurred, and thus some of the versions of the data 305 are shown encrypted by the ransomware, while a set of versions 307 in the tree are shown to be clear, i.e., unencrypted. In this example, the "clear" versions are the versions corresponding to the data writes after the ransomware attack and, as noted above, versioning protects this good data from being overwritten. The versions that are encrypted by the ransomware are sometimes referred to herein as "bad," while the versions that have not been encrypted are sometimes referred to as "good."

The versioning mechanism 302 not only forces any new writes of data to generate a new version, it also enforces one or more access control(s) that are designed to further thwart adversaries from overwriting good data in the data store (the good versions), e.g. with their maliciously-encrypted code (the bad versions). Like the versioning, which is operating at all times, the access controls that prevent the version tree from being modified are also in place (and without regard to whether the ransomware attack has occurred). In the cloud-based object store depicted in FIG. 2, this functionality may be implemented in the access control system (ACS). While in the described embodiment the access controls are implemented in association with the versioning function, this is not a limitation, as existing access control systems, devices, programs or processes may be re-purposed for this function.

The following provides additional details regarding the versioning mechanism 302 access control that enforces several restrictions with respect to the version tree itself. As already noted, and before the ransomware attack occurs, the use of versioning restricts the storage system's ability to update or replace a version already identified on the tree. In addition, access controls are also in place (at all times) to prevent modification of the version tree. This limits the ability of accessors to write new versions of data to the data store to one or more points where an adversary could attack. It further ensures that this new version write function cannot be exploited by the ransomware (even at those points). As noted, the access controls that prevent modification to the tree are always in place. In one embodiment, the system locks any credentials with the ability to manipulate the version tree away from standard users or automated processes that otherwise would have the ability to write to the data store. One way to accomplish this is using version tree-specific Role Based Access Control (RBAC). RBAC is a mechanism to grant users access to specific resources, based on the roles that these users play inside a protected environment. Here, the versioning mechanism 302 is configured to enable an authorized entity to provision an RBAC on the version tree 303 and, in particular, its new version write function. That version tree write RBAC is then enforced against any accessor that attempts to write a new version to the data store following detection of the ransomware attack. The approach here thus assumes that the only way to write a new version is to manipulate the version tree. Other types of access control that may be used for this purpose include access control lists (ACLs), attribute-based access control (ABAC), object locking, and the like. As an alternative, or to augment the access control, the versioning mechanism may also enforce other types of security policies or controls that restrict the ability to modify the version tree. Without limitation, one such policy is a multifactor modification function that requires collaboration across accounts to manipulate the version tree. For example, assume that the version tree or some portion thereof is encrypted and must first be decrypted before it can be changed. In this scenario, the multifactor modification function implements a secret sharing scheme wherein multiple actors need to come together with shares of the secret key (the decryption key) before the key can be applied. The latter approach ensures that no single actor (e.g., the ransomware) can modify the version tree by writing a new infected version. Irrespective of how the version tree access control is implemented, the approach protects the version tree from being manipulated (and thus new versions from being written) after detection of the ransomware attack. Stated another way, the versioning mechanism enables the mitigation system to protect against overwriting the data that it is not yet encrypted by the ransomware.

Once protection of the still unencrypted data is in place by the operation of the versioning mechanism access control as described above, the mitigation system uses the restore mechanism 304 to restore the data (or some portion thereof) that has been encrypted by the ransomware. Of course, the size and scale of the data—be it a small or large enterprise—can easily be more data than large numbers of humans can sort through, let alone in a timely manner. Indeed, the time to restore the data may be more time than the business can afford. Thus, and to augment the above-described versioning function, the restore mechanism 302 provides a reliable way for the target of the ransomware attack to recover from the attack efficiently. To this end, the restore mechanism performs an "entropy-based" analysis of the good versus bad versions of the data in the data tree in an attempt to locate a latest (most recent) "good" version of the data. Typically, the latest good version is the version that has the most up-to-date clean data. Once that latest good version is located, the system then implements version recovery, preferably from that point in the version tree. In particular, recovery may involve one of several different techniques, e.g., copying the latest good version of the data to a new location, moving the top of the version tree to be the identified latest good version, clearing the version tree of the encrypted data versions (leaving only the good versions remaining), or some combination thereof.

The entropy-based analysis preferably works as follows. By way of brief background, in information theory, the entropy of a random variable is the average level of "information" inherent in the variable's possible outcomes. Thus, for example, and in the context of a piece of data that is being communicated over a network, the information value of that data depends on the degree to which the content of the data is surprising. If a highly likely event occurs with respect to the transmission of that data, the data carries very little information; conversely, if a highly unlikely event occurs, the data is much more informative. Entropy represents a measure of the information content of the data. In the context of this disclosure, the restore mechanism leverages an entropy analysis that takes advantage of the adversary by exploiting the mechanism that was used to attack the data in the first instance. In particular, one of the main functions of the ransomware encryption is to "randomize" the data such that it is unrecognizable. As such, and encrypted version of a piece of data exhibits a difference in entropy as compared to the same (or similar) piece of data in an unencrypted form. In practice, an encrypted version of given data exhibits a higher entropy compared to the entropy of that data in the clear. By comparing the relative entropy of data version(s) in the version tree, the restore mechanism 304 determines the last good version of the data that remains after the ransomware attack. As noted above, once this determination is made, recovery can then proceed from the identified latest clear version.

Figure 4:
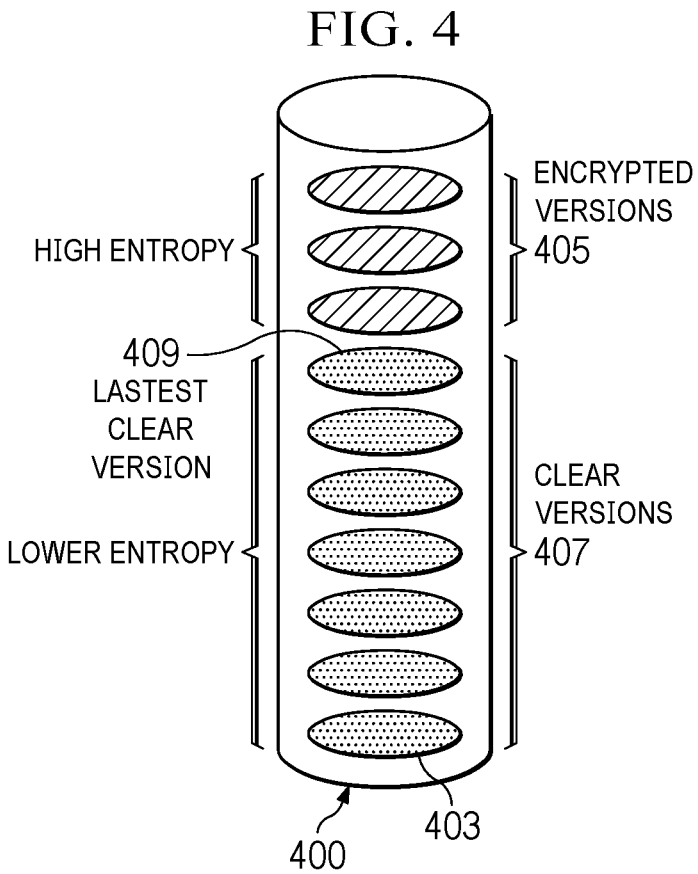
FIG. 4 depicts a state of a version tree in the data store after the ransomware attack has occurred.

This operation is depicted in FIG. 4. The diagram depicts a data store 400 having the version tree 403 with a set of versions. This corresponds to the version tree described above in FIG. 3. The data store 400 has used versioning and the associated access control to protect against overwriting the good data in the manner described above. In this case, after the ransomware attack the data tree has the encrypted (bad) versions 405, and the unencrypted (good) versions 407. As reflected, and based on the entropy analysis, the bad versions 405 have high entropy, and the clear versions have relatively lower entropy. In operation, the restore mechanism executes a scanning function to determine the relative entropy of the version(s) in the tree. In one embodiment, a scanner identifies the encrypted version 405 with the highest entropy value and then compares that value with the entropy computed for each of the unencrypted (clear) versions 407; the clear version that has a lowest relative entropy (as compared to the encrypted version with the highest entropy) is then determined to be the latest clear version. This is version 409 as depicted in FIG. 4.

One measure of relative entropy that may be used here is Kullback-Leibler divergence (also called relative entropy and I-divergence), denoted DKL. (P‖Q), and which is a type of statistical distance, namely, a measure of how one probability distribution P is different from a second, reference probability distribution Q. Other techniques for comparing version entropy include computing a cross-entropy value, computing a mutual information, or the like. As noted above, and once the system identifies the latest clear version 409 from the entropy delta analysis, that version is retrieved from the data store and placed back into the target environment, where it can then be used.

Figure 5:
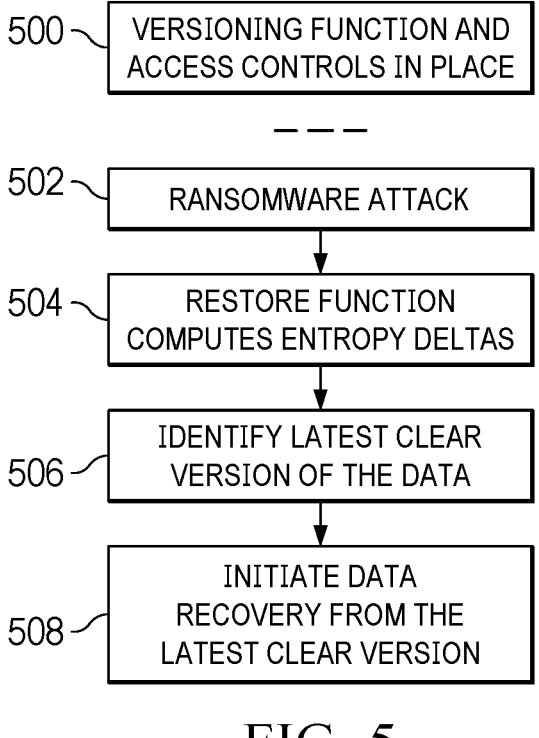
FIG. 5 depicts a process flow of an operation of the ransomware mitigation system of this disclosure.

The versioning and restore functions provide a multi-layer (or multi-phase) defense to the ransomware attack, and the solution addresses the problem of how best to recover from such an attack once it has been detected. FIG. 5 depicts a process flow of the ransomware mitigation system in operation. Prior to any attack (or any detection of that attack), versioning is running (indeed, preferably throughout the lifecycle of the data), and access controls to prevent modification of the version tree are also in place. This is step 500. At step 502, a ransomware attack is indicated as having occurred. The particular method or mechanism to detect the ransomware attack is not an aspect of this disclosure, as there are many known techniques and technologies that perform this function. Thus, and in a typical embodiment, the mitigation system of this disclosure operates in association with a cybersecurity solution, such as a SOAR, a SIEM, an EDR, or an XDR, or some other security component or system. At step 504, the restore function is activated to compute the entropy deltas of the various versions that are present in the data tree. At step 506, the latest clear version of the data is identified. The process then continues at step 508 to initiate the restore from the identified latest clear version that is found from the entropy deltas. The particular manner by which the recovery then proceeds is not limiting, and one of many different restore approaches may be implemented with respect to the version tree.

The above-described technique provides significant advantages. By leveraging the versioning and restore functions together, the mitigation system provides a reliable and efficient technique that enables the target to recover from any successful attack quickly and with the least amount of disruption to its business. The approach turns the attack against the adversary by using entropy calculations to detect malicious injection of data that is trying to corrupt the state of the system. The entropy delta between data versions enables the system to determine (independent of time) what data has been encrypted by the ransomware so that recovery can proceed efficiently. Thus, the approach herein provides for attack mitigation, leveraging the versions maintained using a system that cannot be corrupted by the ransomware. Another benefit of the approach herein is the ability to restore objects with precision, and without resorting to backup copies. Indeed, with the approach herein, the recent good copy is still present in the data store.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the above-described ransomware mitigation system functions are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, cybersecurity products, services and solutions, as well as improvements to the operational capabilities of such systems when used in the manner described.

The nature of the data that is protected in the storage system is dependent on the application and is not intended to be limited. Further, and as previously mentioned, the techniques herein are not limited to any particular data store or storage architecture.

Having described the subject matter, what is claimed is as follows:

1. A method of mitigating a ransomware attack on data stored in a data store, comprising:
versioning data in the data store as a set of versions identified in a data tree, wherein new writes of data to the data store manipulate the data tree by only creating one or more new version(s) in the data tree, and wherein the versioning further implements a multifactor modification security policy which requires a collaboration across multiple user accounts to manipulate the data tree, and wherein the collaboration requires the multiple user accounts to provide respective shares of a secret decryption key to decrypt at least an encrypted portion of the data tree before manipulation of the data tree;
following a ransomware attack that has encrypted one or more versions of the set of versions identified in the data tree, wherein one or more versions of the set of versions in the data tree remain unencrypted, identifying an encrypted version of the set with a highest entropy value;
performing an entropy delta analysis that compares the highest entropy value to respective entropy values of each version of the set that remains unencrypted;
based on the performed entropy delta analysis, identifying a given version of the set that remains unencrypted, wherein the given version has a lowest relative entropy value as compared to the highest entropy value; and
initiating a restore operation with respect to the identified given version.

2. The method as described in claim 1 further including enforcing one or more access controls at one or more defined points in the data tree.

3. The method as described in claim 2 wherein the access control is one of: a role-based access control on the data tree, an access control list on the data tree, an attribute-based access control on the data tree, and a policy that enables manipulation of the data tree only by a set of collaborating entities.

4. The method as described in claim 1 wherein the data store is one of: a database, a file-based data store, and a cloud object data store.

5. The method as described in claim 1 wherein the identified given version is a latest unencrypted version of the data.

6. The method as described in claim 1 wherein initiating the restore operation is an operation that is one of: retrieving the identified given version to a new location in the data store, moving the identified given version to be at a top of the data tree, and clearing the version tree of the one or more versions that are encrypted.

7. The method as described in claim 1 wherein the entropy delta analysis is a relative entropy computation.

8. An apparatus, comprising:

a processor;

computer memory holding computer program instructions executed by the processor to mitigate a ransomware attack on data stored in a data store as a set of versions, the set of versions identified in a data tree, the computer program instructions comprising program code configured to:

version data in the data store as a set of versions identified in a data tree, wherein new writes of data to the data store manipulate the data tree by only creating one or more new version(s) in the data tree, and wherein versioning the data further implements a multifactor modification security policy which requires a collaboration across multiple user accounts to manipulate the data tree, and wherein the collaboration requires the multiple user accounts to provide respective shares of a secret decryption key to decrypt at least an encrypted portion of the data tree before manipulation of the data tree;

following a ransomware attack that has encrypted one or more versions of the set of versions identified in the data tree, wherein one or more versions of the set remain unencrypted, identify an encrypted version of the set with a highest entropy value;

perform an entropy delta analysis that compares the highest entropy value to respective entropy values of each version of the set that remains unencrypted;

based on the performed entropy delta analysis, identify a given version of the set that remains unencrypted, wherein the given version has a lowest relative entropy value as compared to the highest entropy value; and initiate a restore operation with respect to the identified given version.

9. The apparatus as described in claim 8 wherein the program code is further configured to enforce one or more access controls at one or more defined points in the data tree.

10. The apparatus as described in claim 9 wherein, with respect to the data tree, the access control is one of: a role-based access control on the data tree, an access control list on the data tree, an attribute-based access control on the data tree, and a policy that enables manipulation of the data tree only by a set of collaborating entities.

11. The apparatus as described in claim 8 wherein the data store is one of: a database, a file-based data store, and a cloud object data store.

12. The apparatus as described in claim 8 wherein the identified given version is a latest unencrypted version of the data.

13. The apparatus as described in claim 8 wherein the program code configured to initiate the restore operation includes program code configured to perform one of: retrieving the identified given version to a new location in the data store, moving the identified given version to be at a top of the data tree, and clearing the version tree of the one or more versions that are encrypted.

14. The apparatus as described in claim 8 wherein the entropy delta analysis is a relative entropy computation.

15. A computer program product comprising:

one or more computer-readable storage media; and program instructions stored on the one or more computer-readable storage media to perform operations which mitigate a ransomware attack on data stored in a data store as a set of versions, the set of versions identified in a data tree, the operations comprising:

versioning data in the data store as a set of versions identified in a data tree, wherein new writes of data to the data store manipulate the data tree by only creating one or more new version(s) in the data tree, and wherein the versioning further implements a multifactor modification security policy which requires a collaboration across multiple user accounts to manipulate the data tree, and wherein the collaboration requires the multiple user accounts to provide respective shares of a secret decryption key to decrypt at least an encrypted portion of the data tree before manipulation of the data tree;

following a ransomware attack that has encrypted one or more versions of the set of versions identified in the data tree, wherein one or more versions of the set remain unencrypted, identifying an encrypted version of the set with a highest entropy value;

performing an entropy delta analysis that compares the highest entropy value to respective entropy values of each version of the set that remains unencrypted;

based on the performed entropy delta analysis, identifying a given version of the set that remains unencrypted, wherein the given version has a lowest relative entropy value as compared to the highest entropy value; and initiating a restore operation with respect to the identified given version.

16. The computer program product as described in claim 15 wherein one or more access controls are enforced at one or more defined points in the data tree.

17. The computer program product as described in claim 16 wherein the access control is one of: a role-based access control on the data tree, an access control list on the data tree, an attribute-based access control on the data tree, and a policy that enables manipulation of the data tree only by a set of collaborating entities.

18. The computer program product as described in claim 15 wherein the data store is one of: a database, a file-based data store, and a cloud object data store.

19. The computer program product as described in claim 15 wherein the identified given version is a latest unencrypted version of the data.

20. The computer program product as described in claim 15 wherein the initiating comprises operations to perform one of: retrieving the identified given version to a new location in the data store, moving the identified given version to be at a top of the data tree, and clearing the version tree of the one or more versions that are encrypted.

21. The computer program product as described in claim 15 wherein the entropy delta analysis is a relative entropy computation.

22. A computing system for ransomware attack mitigation, comprising:

a processor set;

one or more computer-readable storage media; and program instructions stored on the one or more computer-readable storage media to cause the processor set to perform operations comprising:

implementing a versioning mechanism to store data in a data store as a set of versions identified in a data tree, wherein a version in the set of versions can only be updated by writing a new version to the data tree, and to enforce an access control to prevent modification of the data tree, and wherein the versioning mechanism further implements a multifactor modification security policy which requires a collaboration across multiple user accounts to manipulate the data tree, and wherein the collaboration requires the multiple user accounts to provide respective shares of a secret decryption key to decrypt at least an encrypted portion of the data tree before manipulation of the data tree; and implementing a restore mechanism to execute a restore function that identifies from the data tree a latest clear version of the data, and that initiates a restore operation with respect to the latest clear version, wherein identification of the latest clear version of the data further comprises:

identifying an encrypted version of the set with a highest entropy value;

performing an entropy delta analysis that compares the highest entropy value to respective entropy values of each version of the set that remains unencrypted; and identifying an unencrypted version of the set with a lowest relative entropy value, as compared to the highest entropy value, as the latest clear version of the data.

23. The computing system as described in claim 22 wherein the restore operation clears the version tree of the version that is encrypted.

24. A method operating in a computing system wherein versions of data are identified in a data store in a data tree, and wherein a version can only be updated by writing a new version to the data tree, and wherein manipulation of the data tree requires a collaboration across multiple user accounts where the collaboration requires the multiple user accounts to provide respective shares of a secret decryption key to decrypt at least an encrypted portion of the data tree before manipulation of the data tree, comprising:

responsive to a ransomware attack that has encrypted one or more versions of a set of versions identified in the data tree, identifying an encrypted version of the set with a highest entropy value;

performing an entropy delta analysis that compares the highest entropy value to respective entropy values of each version of the set that remains unencrypted;

based on the performed entropy delta analysis, identify a latest version of the set that remains unencrypted, wherein the latest version has a lowest relative entropy value as compared to the highest entropy value; and initiate a restore operation with respect to the latest version.

* * * * *